Figure 1:
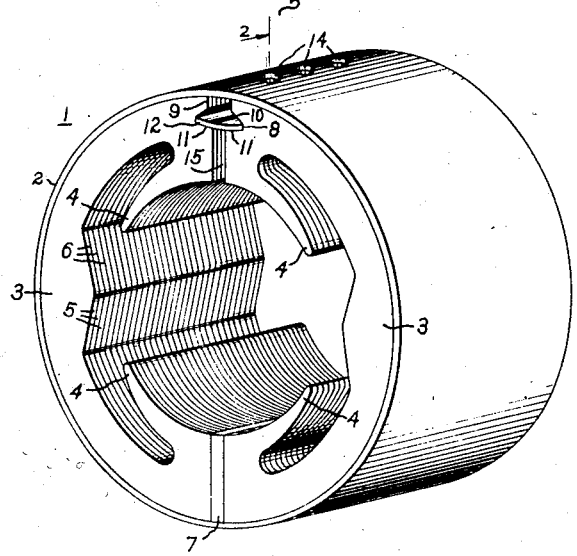

Dec. 19, 1950 G. D. WILLITS 2,535,004
STATOR FOR UNIVERSAL ELECTRIC MOTORS
Filed March 29, 1949

Inventor:
Glenn D. Willits,
by Browell P. Mack
His Attorney

Patented Dec. 19, 1950

2,535,004

UNITED STATES PATENT OFFICE 2,535,004

STATOR FOR UNIVERSAL ELECTRIC MOTORS

Glenn D. Willits, Leo, Ind., assignor to General Electric Company, a corporation of New York Application March 29, 1949, Serial No. 84,106

4 Claims. (Cl. 171—252)

My invention relates to dynamoelectric machines and more particularly to dynamoelectric machines of the commutator type having stator members provided with salient field poles. More specifically, the invention relates to universal electric motors, for operation on either alternating current or direct current, which are provided with a salient pole stator member in which the magnetic structure is arranged to compensate for the armature reaction of the rotor member.

In commutator-type dynamoelectric machines it is necessary, for maximum efficiency, to effect substantial neutralization of the armature reaction at the point of commutation. This is especially important for universal motors which must operate on either alternating or direct current. Various means are employed to neutralize the armature reaction of such a motor, among which is the method of constructing the stator in a manner such that the field magnet structure of the stator automatically compensates for the armature reaction. In one form of such a construction compensated stator, the magnetic structure is divided through the center of each field pole along a plane coinciding with the center line of the motor. This construction permits approximately the same air gap flux as if the magnetic structure were not divided but, at the same time, provides a high reluctance path for armature reaction flux through the magnetic structure of the stator, thus substantially neutralizing the armature reaction.

It is an object of this invention to provide an improved type of construction for construction compensated stator members of the divided pole type.

It is a further object of the invention to provide a type of construction for stator members of this type which is simple and inexpensive.

A still further object of my invention is the provision of a form of construction for stator members of the divided pole type which is readily adaptable to mass production techniques and procedures.

In carrying out my invention in one form, I provide a stator member for a dynamoelectric machine which has an outer retaining ring of non-magnetic material. Positioned inside the retaining ring is the magnetic structure which has a divided circular yoke portion of laminated magnetic steel. On opposite sides of the center line of the stator, two projections extend radially inward from the yoke portion to form two field poles. Each such polar projection and the portion of the yoke from which it projects is split along a plane which coincides with the center line of the stator member, forming two semi-circular yoke segments. A layer of non-magnetic material is located between the two yoke segments on one side of the center line. On the opposite side of the center line at the outer radial terminus of the separation between the two segments of the yoke, each yoke segment has an indentation across the split surface thereof parallel to the center line. The indentations on the two segments are directly opposite each other and are adapted to hold a spring-wedge member between them. The spring-wedge member separates the two yoke segments magnetically on that side of the center line and secures the two segments of the magnetic yoke against the outer ring while simultaneously retaining in position the laminations of which the yoke segments are comprised.

Figure 2:
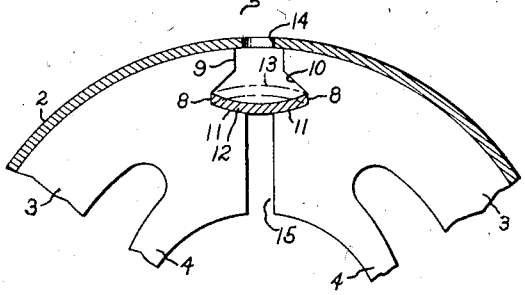

For a more complete understanding of my invention, reference should be had to the accompanying drawing, Fig. 1 of which is a perspective view of a stator member embodying my invention, while Fig. 2 is a partial view in section along the line 2 of Fig. 1.

Referring to Fig. 1 of the drawing, a stator member in which my invention is incorporated is designated generally by the numeral 1. The stator 1 has an outer cylindrical protective and retaining member 2 which is made of a non-magnetic material with good tensile strength qualities, such as aluminum or stainless steel. Immediately inside the inner surface of member 2 is a substantially circular magnetic yoke portion composed of two separated yoke segments 3. The substantially semi-circular yoke segments 3 have two radially extending inward projections 4, each of which forms half of a salient field pole. Taken together, two adjacent, closely spaced, but slightly separated projections 4 form a field pole adaptable for the location thereof of a suitable exciting winding (not shown). Yoke segments 3 and their inward projections 4 are laminated, being made of a plurality of relatively thin arcuate flat sheets or laminations 5 of magnetic material, preferably steel. The flat sheets 5 are positioned perpendicularly to the center line of stator member 1, with adjacent sheets being preferably separated by a thin layer 6 of electrically insulating material in order to substantially prevent eddy currents due to alternating magnetic flux in the magnet structure composed of the circular yoke and field poles.

Yoke members 3 and polar projections 4 thereon are separated magnetically by a layer 7 of non-magnetic material, which may be either metallic or non-metallic, on one side of the center line of stator 1 and an air space 15 on the opposite side of the center line. Layer 7 and space 15 are coplanar, with the plane along which they lie coinciding with the center line of stator 1 and the center lines of the field poles, thus dividing the circular magnetic yoke and field poles 4, 4 attached thereto into two substantially duplicate yoke segments 3. On the outer periphery of the circular magnetic yoke 3, 3 at the outer radial terminus of space 15, each yoke segment 3 has in the radial surface abutting on space 15 a recess parallel to the center line of the stator and best seen in Fig. 2. These recesses, which extend entirely across segments 3, comprise a deeper portion 8 near the center line of stator 1 and a shallower portion 9 extending from the deeper portion to the outer circular surface of the yoke segment. Between portions 8 and 9 of each recess is a shoulder portion 10, while on the opposite side of portion 8 is a curved shoulder 11. Positioned between the deep portions 8 of the recesses in segments 3 and supported by surfaces 11 is a curved spring-wedge member 12 made of non-magnetic material such as brass or stainless steel. In the construction of stator 1, wedge member 12 is inserted betwen portions 8 of the recesses in the position indicated by dotted lines 13 in Fig. 2. Then member 12 is sprung into the final position against surfaces 11, as shown by the solid lines in Fig. 2, by inserting a suitable rod-like instrument in apertures 14 in outer retaining member 2 and applying pressure on member 12 toward the center line of the stator. Member 12 is at least as long as the depth of yoke segments 3, and after it has been sprung into its final wedged position, it serves to retain in the correct position laminations 5 of which the magnetic structure is composed and simultaneously to secure yoke segments 3 within retaining ring 2.

While the stator member 1 of the drawing has two polar projections 4, 4, it will be readily apparent that this construction is equally applicable to multi-polar stators having four or more poles. Furthermore, while a laminated magnetic structure is shown, it will be readily understood that yoke segments of solid magnetic material may be used. A stator constructed in accordance with my invention is especially applicable to universal motors but may be used also for other commutator type dynamoelectric machines including series, shunt, and compound wound.

While I have illustrated and described one preferred embodiment of my invention, many modifications will occur to those skilled in the art and, therefore, it should be understood that I intend to cover by the appended claims any such modifications which fall within the true spirit and scope of my invention.

What I claim as new and desire to secure by Letters Patent of the United States is:

1. A stationary member for a dynamoelectric machine comprising an annular non-magnetic outer retaining ring, a substantially circular magnetic yoke portion positioned immediately adjacent the inner surface of said retaining ring, a polar projection extending radially inward from said yoke, a second polar projection diametrically opposite said first projection extending radially inward from said yoke, said yoke and said first-named and said second-named projections being separated by a non-magnetic medium along a diameter of said yoke extending substantially through the centers of said first-named and said second-named projections forming two substantially semi-circular yoke segments whereby a path of high reluctance is provided for armature reaction flux, and a non-magnetic spring wedge member positioned between said yoke segments near one outer radial extremity of the separation between them tightly securing said yoke segments against said outer retaining ring.

2. An armature reaction compensated stator member for a commutator type motor, said stator member comprising a substantially circular magnetic yoke portion, a projection extending radially inward from said yoke to form one field pole, a diametrically opposed second projection extending radially inward from said yoke to form a second field pole, said yoke and said first-named projection and said second-named projection being divided along a plane coinciding with said center line and passing through the centers of said first-named projection and said second-named projection by an air space on one side of said center line and a layer of non-magnetic material on the other side of the center line forming two semi-circular yoke segments, each of said segments having a recess in the radial surface adjoining said air space at the outer radial extremity of said space, said recesses being parallel to said center line and extending the full depth of said yoke segments, said two recesses being directly opposite each other on opposing radial surfaces of said yoke segments, and each recess having a deeper portion adapted to contain one side of a spring-wedge member, a non-magnetic spring-wedge member positioned between said recesses in said deeper portions and extending across the entire depth of said yoke segments parallel to said center line, an outer circular retaining member of non-magnetic material around the outer periphery of said circular yoke, and a plurality of apertures in said outer retaining member at the point where said spring-wedge is located to permit the insertion of a rod-like tool to properly position said spring-wedge member during construction of the stator member.

3. In a commutator electric motor of the universal type for operation on either alternating current or direct current, an armature reaction compensated stator comprising an outer cylindrical enclosing member of non-magnetic material, two combination yoke and pole members substantially semi-circular in form positioned adjacent the inner surface of said enclosing member forming a substantially circular magnet structure, each such yoke and pole member comprising a plurality of laminations of magnetic steel, inwardly extending portions of each such combination yoke and pole member forming half of two magnetic field poles, a layer of non-magnetic material positioned between said two yoke and pole members on one side of the center line of said stator, and a curved non-magnetic spacer member wedged between said combination yoke and pole members near the outer radial terminus of the separation between the yoke and pole members on the opposite side of said center line, said curved spacer member extending along the entire depth of said yoke and pole members parallel to said center line to bias said yoke and pole members against said outer enclosing member and retain in position the laminations comprising said yoke and pole members, said curved spacer member forming jointly with said layer of non-magnetic material two opposite field pole projections magnetically divided along a common plane coinciding with said center line whereby a path of high reluctance is provided for armature reaction flux.

4. In a commutator type dynamoelectric machine, an armature reaction compensated stator comprising an outer cylindrical enclosing member of non-magnetic material, a plurality of magnetic yoke and pole members positioned around the inner surface of said enclosing member forming a substantially circular magnet structure, inwardly extending portions of each such combination yoke and pole member forming half of each of two magnetc field poles, a curved non-magnetic spacer wedged between two adjacent yoke and pole members, and layers of non-magnetic material positioned between the balance of adjacent yoke and pole members, said curved spacer biasing all said yoke and pole members against said outer enclosing member, said curved spacer forming jointly with said layers of non-magnetic material a plurality of magnetically divided field pole projections whereby a path of high reluctance is provided for armature reaction flux.

GLENN D. WILLITS.

REFERENCES CITED

The following references are of record in the file of this patent:

UNITED STATES PATENTS

| Number | Name | Date |
|---|---|---|
| 335,998 | Fisher | Feb. 9, 1886 |
| 1,353,658 | Kostko | Sept. 21, 1920 |
| 2,073,526 | Pestarini | Mar. 9, 1937 |

FOREIGN PATENTS

| Number | Country | Date |
|---|---|---|
| 317,781 | Germany | Dec. 31, 1919 |